United States Patent [19]
Arakawa et al.
[11] Patent Number: 4,845,369
[45] Date of Patent: Jul. 4, 1989

[54] RADIATION IMAGE STORAGE PANEL HAVING IMPROVED ANTI-STATIC PROPERTIES

[75] Inventors: Satoshi Arakawa; Katsuhiro Kohda, both of Minami-ashigara, Japan

[73] Assignee: Fuji Photo Film Co., Ltd., Kanagawa, Japan

[21] Appl. No.: 136,963

[22] Filed: Dec. 23, 1987

[30] Foreign Application Priority Data

Dec. 27, 1986 [JP] Japan ................................ 61-309751

[51] Int. Cl.4 ................................................ B32B 5/16
[52] U.S. Cl. ................................................ 250/484.1
[58] Field of Search ................ 250/483.1, 484.1, 327.2

[56] References Cited

U.S. PATENT DOCUMENTS

| | | | |
|---|---|---|---|
| 4,090,085 | 5/1978 | Shimiya et al. | 250/483.1 |
| 4,354,213 | 10/1982 | Martinelli | 360/133 |
| 4,704,538 | 11/1987 | Kitada | 250/483.1 |
| 4,728,583 | 3/1988 | Yamazaki et al. | 250/327.2 A |

*Primary Examiner*—Carolyn E. Fields
*Assistant Examiner*—John A. Miller
*Attorney, Agent, or Firm*—Gerald J. Ferguson, Jr.

[57] ABSTRACT

A radiation image storage panel comprises a support made of a plastic film or a paper material, a stimulable phosphor layer and optionally one or more other layers. The radiation image storage panel contains a fibrous conductive material in at least one layer.

8 Claims, 1 Drawing Sheet

RADIATION IMAGE STORAGE PANEL HAVING IMPROVED ANTI-STATIC PROPERTIES

BACKGROUND OF THE INVENTION

1. Field of the Invention

The present invention relates to a radiation image storge panel employed in a radiation image recording and reproducing method utilizing a stimulable phosphor.

2. Description of the Prior Art

As a method replacing a conventional radiography, a radiation image recording and reproducing method utilizing a stimulable phosphor as described, for instance, in U.S. Pat. No. 4,239,968, has been recently paid much attention. In this method, a radiation image storage panel comprising a stimulable phosphor (i.e., stimulable phosphor sheet) is employed, and the method involves the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to an object at considerably smaller dose, as compared with the conventional radiography. Accordingly, this method is of great value especially when the method is used for medical diagnosis.

The radiation image storage panel employed in the above-described radiation image recording and reproducing method basically comprise a support and a stimulable phosphor layer provided thereon. Further, a transparent film is generally provided on the free surface of the phosphor layer (a surface not facing the support) to keep the phosphor layer from chemical deterioration and physical shock.

The phosphor layer generally comprises a binder and stimulable phosphor particles dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating (scanning) the panel with stimulating rays. The stimulated emission is then photoelectrically detected to give electric signals, so as to reproduce a visible image from the electric signals.

The radiation image recording and reproducing method is very advantageous for obtaining a visible image as described above, and the radiation image storage panel used in the method is desired to have high sensitivity and provide an image of high quality (high sharpness, high graininess, etc.), as well as a radiographic intensifying screen used in the conventional radiography.

In performing the radiation image recording and reproducing method, the radiation image storage panel is repeatedly used in a cyclic procedure comprising the steps of: exposing the panel to a radiation (recording radiation image thereon), irradiating the panel with stimulating rays (reading out the recorded radiation image therefrom) and irradiating the panel with a light for erasure (erasing the remaining radiaton image therefrom). The panel is transferred from a step to the subsequent step in a transfer system in such a manner that the panel is sandwiched between transferring members (e.g., rolls and endless belt) of the system, and piled on other panel to be stored after one cycle is completed.

The repeated use of the panel comprising transferring and piling causes physical contacts such as a friction between the surface of the panel (surface of the phosphor layer or surface of the protective film) and a surface of other panel (surface of the support), friction between an edge of the panel and a surface of other panel, and a friction between the panel and transferring members (e.g., roll and belt).

As a support material of the radiation image storage panel, desirably employed are plastic films such as a polyethylene terephthalate film and various papers from the viewpoint of flexibility required in the transferring procedure of the panel.

However, the panel having the support made of a polymer material or a paper is apt to be electrostatically charged on its surface owing to the physical contact in the transferring procedure. In detail, the surface (front surface) of the panel is apt to be negatively charged and other surface (back surface) thereof is apt to be positively charged. This static electrification causes various problems in the practical operation of the radiation image recording and reproducing method.

For example, when the surface of the panel is electrostatically charged, the surface of the panel easily adheres to a back surface of other panel and thus adhered panels hardly separate from each other in the vertical direction against the panel surface. Accordingly, those panels are transferred together in layers from the piling position into the transfer system, whereby the subsequent procedure cannot be normally conducted. The read-out procedure of the panel is generally carried out by irradiating the panel with stimulating rays from the phosphor layer-side surface of the panel, and in this procedure, the charged surface of the panel is likely to be deposited with dust in air, so that the stimulating rays are also scattered on the dust deposited thereon and the quality of the resulting image lowers. Moreover, the panel decreases in the sensitivity or the resulting image provided by the panel suffers noise such as static mark when discharge takes place, and a shock is sometimes given to the operator because of the discharge from the panel.

For the purpose of improving the sensitivity of the storage panel, Japanese Patent Provisional Publication No. 56(1981)-12600 discloses that a light-reflecting layer containing a white pigment (e.g., titanium white, basic lead carbonate, zinc sulfide, alumina and magnesium oxide) between the support and the stimulable phosphor layer. For the same purpose for enhancing the sensitivity, there has been proposed that a light-reflecting material such as titanium dioxide, aluminum oxide, silicon oxide and zinc oxide is incorporated into the support made of a plastic film, as described in Japanese Patent Provisional Publication No. 59(1984)-72437. Otherwise, a support of a plastic film is incorporated with a light-absorbing material such as carbon black for improving the quality of an image provided by the panel. However, the amount of carbon black to be incorporated into the support for that purpose is very small, so that even in the case of using the support containing carbon black, the resulting panel is not sufficiently prevented from static electrification on the surface. For example, a commercially available panel having a support containing carbon black (trade name: Fuji CR Imaging Plate, available from Fuji Photo Film Co., Ltd.) has a resistivity of hither than $10^{15}$ ohm on the surface of the support.

With respect to improvements of the above-mentioned static electrification of the panel, there are patent applications for a radiation image storage panel provided with an antistatic layer made of a conductive material and having a low specific surface resistivity (not higher than $10^{11}$ ohm) on the surface of the support not facing the phosphor layer (Japanese Patent Application No. 60(1985)-228418 and a radiation image storage panel provided with an antistatic layer made of at least one conductive material selected from the group consisting of a metal oxide, carbon black and a conductive organic material and having a low specific surface resistivity (not higher than $10^{12}$ ohm) between the support and the phosphor layer (Japanese Patent Application No. 61(1986)-242795).

SUMMARY OF THE INVENTION

It is an object of the present invention to provide a radiation image storage panel which is improved in the antistatic properties.

It is another object of the invention to provide a radiation image storage panel which is almost free from occurrence of uneveness of images (formation of static mark) caused by static discharge from the panel to give an improved image.

The objects can be accomplished by a radiation image storage panel comprising a support made of a plastic film or a paper material, a stimulable phosphor layer, and optionally one or more other layers provided on the support, characterized in that a fibrous conductive material is contained in at least a portion of said radiation image storage panel.

According to the present invention, a fibrous conductive material is incorporated into at least a portion of the radiation image storage panel, whereby the panel can be kept from various troubles caused by the static electrification on both surfaces, particularly on the read-out side surface (phosphor layer-side surface) of the panel. That is, in the repeated use of the panel comprising steps of transferring and piling in a radiation image recording and reproducing apparatus, there can be achieved by the present invention an improvement of the transfer properties, prevention of deposit of dust onto the panel surface and an enhancement of the quality of an image provided by the panel.

Especially when the fibrous conductive material is contained in the dispersed form in at least one of layers constituting the panel such as a protective layer (i.e., friction-reducing layer), an undercoating layer, a lighteflecting layer, a stimulable phosphor layer and an adhesive layer and the surface resistivity of the layer containing said fibrous conductive material is set to a value of not higher than $10^{12}$ ohm, the static electrification occurring on the surface of the radiation image storage panel can be effectively obviated. The surface resistivity used herein means a surface resistivity determined under the conditions of a temperature of 23° C. and a humidity of 53% RH.

In the radiation image storage panel of the invention, various troubles caused by the static electrification occurring on the surface of the stimulable phosphor layer can be very effectively prevented owing to the fibrous conductive material contained in the panel. The reason is presumed as follows: lines of electric force extending towards outside of the panel from the static charge deposited on the surface of the stimulable phosphor layer is bent by the fibrous conductive material to advance in the inside direction (i.e., back surface direction of the panel), that is, the lines of electric force forms closed circles, and hence the surface of the stimulable phosphor layer is not apparently electrified.

The conductive material contained in the panel of the invention is in the fibrous form, while the conventional conductive material is in the particulate form, so that fibers of the material according to the invention are interlocked with each other to reduce the surface resistivity of the panel even in a relatively small amount. As a result, the static electrification on the surface of the panel can be effectively reduced even by using the conductive material in a smaller amount than the conventional particulate conductive material.

Accordingly, the phosphor layer-side surface of the panel is reduced in the attraction force for other material which is caused by the static charge. In the radiation image recording and reproducing apparatus, a panel piled on other panels is generally separated from others by lifting it in the direction vertical to the direction of panel surface by means of a suction cup, etc. According to the invention, it is prevented that two panels are introduced into the transfer system in the combined form from the piling state to the transferring state in the apparatus. Further, the storage panel is effectively kept from deposit of dust on the phosphor layer-side surface. Moreover, since the static discharge of the panel surface can be prominently reduced, the lowering of the sensitivity and the occurrence of noise (static mark) on an image provided by the panel are also prevented, and other adverse effects caused by the discharge such as a shock are apparently reduced.

DETAILED DESCRIPTION OF THE INVENTION

The radiation image storage panel of the present invention is described in detail hereinafter referring to the attached drawings.

FIGS. 1–6 are sectional views which show respectively favorable embodiments of the radiation image storage panel according to the invention.

Figure 1:
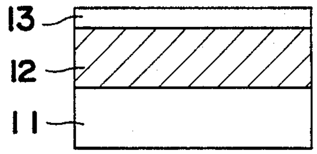
FIGS. 1–5 are sectional views illustrating various constitutions of the radiation image storage panels according to the invention.

In FIG. 1, the radiation iamge storage panel comprises a support 11, a stimulable phosphor layer 12 and a protective film 13, superposed in order, and a fibrous conductive material is contained in the stimulable phosphor layer 12.

Figure 2:
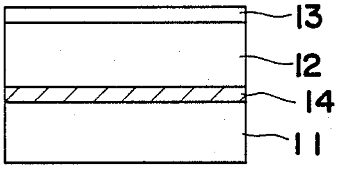

In FIG. 2, an undercoating layer 14 is further provided between a support 11 and a stimulable phosphor layer 12, and a fibrous conductive material is contained in the undercoating layer 14.

Figure 3:
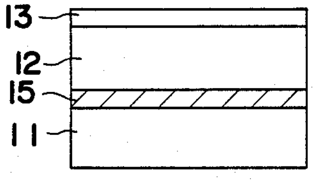

In FIG. 3, a light-reflecting layer 15 is provided between a support 11 and a stimulable phosphor layer 12, and a fibrous conductive material is contained in the light-reflecting layer 15.

Figure 4:
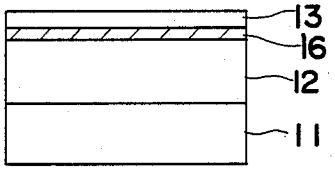

In FIG. 4, a fibrous conductive material is contained in an adhesive layer 16.

Figure 5:
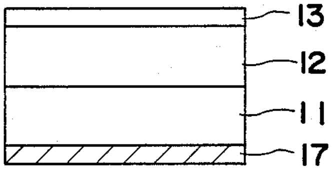

In FIG. 5, a layer 17 made of a fibrous conductive material is provided on one surface of a support 11 not facing a stimulable phosphor layer 12.

The above-mentioned embodiments are given as only representative examples, and it should be understood that the radiation image storage panel of the invention is by no means restricted to the above-mentioned ones. Any other panels can be also applied to the invention, provided that the panel comprises at least a support and a stimulable phosphor layer and the fibrous conductive material is contained in any layer of layers constituting the panel. For example, the fibrous conductive material can be contained in a support or a protective film. Otherwise, a thin layer composed of the fibrous conductive material can be placed on the phosphor layer-side surface of the panel or between optional layers of the storage panel.

The radiation image storage panel can be prepared, for example, by the following process.

Examples of the support material employable in the radiation image storage panel of the invention include plastic films such as films of cellulose acetate, polyester, polyethylene terephthalate, polyamide, polyimide, triacetate and polycarbonate; and various papers such as ordinary paper, baryta paper, resin-coated paper, pigment papers containing titanium dioxide or the like and papers sized with polyvinyl alcohol or the like. From the viewpoint of characteristics of a radiation image recording material and handling thereof, a plastic film is preferably employed as the support material in the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

On the surface of the support where a stimulable phosphor layer is to be coated may be provided a light-reflecting layer to improve the sensitivity of the panel.

The light-reflecting layer comprises a binder and a light-reflecting material dispersed therein.

Examples of the light-reflecting materials employable in the invention include white pigments such as $Al_2O_3$, $ZrO_2$, $TiO_2$, $BaSO_4$, $SiO_2$, ZnS, ZnO, MgO, $CaCO_3$, $Sb_2O_3$, $Nb_2O_5$, $2PbCO_2$, $Pb(OH)_2$, $M^{II}FX$ (in which $M^{II}$ is at least one of Ba, Ca and Sr, and X is at least one of Cl and Br), lithopone ($BaSO_4+ZnS$), magnesium silicate, basic silicon sulfate white lead, basic phosphate lead and aluminum silicate; and polymer particles (polymer pigments) of hollow structure. A hollow polymer particle is composed for example of a styrene polymer or a styrene/acrylic copolymer, and has an outer diameter ranging from 0.2 to 1 $\mu m$ and an inner diameter ranging from 0.05 to 0.7 $\mu m$.

The light-reflecting layer can be formed on the support by well mixing the light-reflecting material and a binder in an appropriate solvent to prepare a coating solution (dispersion) homogeneously containing the light-reflecting material in the binder solution, coating the solution over the surface of the support to give a coated layer of the solution, and drying the coated layer under heating.

The binder and solvents for the light-reflecting layer can be selected from those used in the preparation of a stimulable phosphor layer which will be described hereinafter. In the case of using hollow polymer particles as the light-relecting material, an aqueous polymer material such as an acrylic acid polymer can be used as the binder. The coating solution for the preparation of the light-reflecting layer may further contain a variety of additives contained in a coating dispersion for a phosphor layer (also described hereinafter) such as a dispersing agent, a plasticizer and a colorant.

A ratio of amount between the binder and the light-reflecting layer in the coating solution is generally in the range of 1:1 to 1:50 (binder: light-reflecting material, by weight), preferably in the range of 1:2 to 1:20. The thickness of the light-reflecting layer is preferably in the range of 5 to 100 $\mu m$.

The light-reflecting layer may contain a fibrous conductive material, that is a characteristic requisite of the invention.

An example of the fibrous conductive material employable in the invention is a conductive whisker (i.e., monocrystalline fiber). Concrete examples of the fibrous conductive material include a material obtained by subjecting a whisker such as $K_2O.nTiO_2$ (wherein n is an integer of from 1 to 8) and $Na_2O.nTiO_2$ (wherein n is the same as above) to a conducting treatment on its surface using C, ZnO, $SnO_2$, $InO_2$ or ITO (i.e., mixed crystal of $SnO_2$ and $InO_2$).

The average diameter of the fibrous conductive material is in the range of 0.1 to 1.0 $\mu m$, and the average length thereof is in the range of 5 to 50 $\mu m$. The ratio between the average diameter to the average length is generally not less than 1/5 (average diameter/average length), preferably in the range of 1/10 to 1/200.

The fibrous conductive material is added to the solvent as well as the light-reflecting material in the preparation of a coating solution, and the obtained coating solution is treated in the same manner as stated above to give a light-reflecting layer. The amount of the fibrous conductive material to be contained in the light-reflecting layer varies depending on the amount of the light-reflecting material, the thickness of the light-reflecting layer, etc. Generally, the amount of the fibrous conductive material is in the range of 1 to 50% by weight, preferably 5 to 20% by weight, based on the amount of the light-reflecting material.

The light-reflecting layer containing the fibrous conductive material preferably has a surface resistivity of not higher than $10^{12}$ ohm. The surface resistivity used herein means a value determined under the conditions of a temperature of 23° C. and a humidity of 53% RH as described before.

On the surface of the support may be provided an undercoating layer to enhance the adhesion between the support and the stimulable phosphor layer.

Examples of the materials of the undercoating layer employable in the invention include resins such as polyacrylic resins, polyester resins, polyurethane resins, polyvinyl acetate resins and ethylene/vinyl acetate copolymers. However, those resins are given by no means to restrict resins employable in the invention. For example, other resins which are optionally used for the conventional undercoating layers can be also employed in the invention. Further, the resin for the undercoating layer may be crosslinked with a crosslinking agent such as aliphatic isocyanate, aromatic isocyante, melamine, amino resin and their derivatives.

The formation of the undercoating layer on the support can be conducted by dissolving the above-mentioned resin in an appropriate solvent to prepare a coating solution, uniformly and evenly coating the solution over the surface of the support by a convention coating method to give a coated layer, and then heating the coated layer slowly to dryness. The solvent for the coating solution of the undercoating layer can be selected from those used in the preparation of a stimulable phosphor layer which will be described hereinafter. The thickness of the undercoating layer preferably ranges from 3 to 50 $\mu$m.

The undercoating layer can contain the fibrous conductive material according to the invention. In this case, the fibrous conductive material is added to the solvent as well as the above-mentioned resin to prepare a coating solution for an undercoating layer. Using the obtained coating solution, an undercoating layer is formed on the support in the same manner as described above. The amount of the fibrous conductive material to be contained in the undercoating layer varies depending on the thickness of the undercoating layer, etc. Generally, the amount thereof is in the range of 1 to 50% by weight, preferably in the range of 5 to 20% by weight, based on the amount of the resin.

The undercoating layer containing the fibrous conductive material preferably has a surface resistivity of not higher than $10^{12}$ ohm from the viewpoint of antistatic properties. When the surface resistivity of the undercoating layer is excessively low, the resulting panel piled on other panel is hardly moved in the direction of panel surface because of apparent friction between the two panels becomes large, or the edge portion of the panel is readily charged or discharged to give shocks to a human body when the edge of the panel is brought into contact with the human body. Accordingly, the surface resistivity of the undercoating layer preferably is not lower than $10^7$ ohm from the viewpoints of easy separation between piled panels and prevention of shocks caused by the static charge or discharge.

In the invention, the fibrous conductive material is preferably contained (dispersed) in the undercoating layer from the viewpoints of the antistatic effect, easiness of manufacturing, etc.

As described in U.S. patent application Ser. No. 496,278, the phosphor layer-side surface of the support (or the surface of a light-reflecting layer or an undercoating layer in the case that such layers are provided on the phosphor layer) may be provided with protruded and depressed portions for enhancement of the sharpness of the image.

Subsequently, on the support (or light-reflecting layer, or undercoating layer) is provided a stimulable phosphor layer. The stimulable phosphor layer basically comprises a binder and stimulable phosphor particles dispersed therein. The stimulable phosphor, as described hereinbefore, gives stimulated emission when excited with stimulating rays after exposure to a radiation. From the viewpoint of practical use, the stimulable phosphor is desired to emit light in the wavelength region of 300–500 nm when excited with stimulating rays in the wavelength region of 400–900 nm.

Examples of the stimulable phosphor employable in the panel of the invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, $BaO \cdot xAl_2O_3$:Eu, in which x is a number satisfying the condition of $0.8 \leqq x \leqq 10$, and $M^{2+}O \cdot xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Tb, Tl, Bi and Mn, and x is a number satisfying the condition of $0.5 \leqq x \leqq 2.5$, as stated in U.S. Pat. No. 4,236,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$ and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in U.S. Pat. No. 4,236,078;

$(Ba_{1-x},M^{II}_x)FX:yA$, in which $M^{II}$ is at least one divalent metal selected from the group consisting of Mg, Ca, Sr, Zn and Cd, X is at least one element selected from the group consisting of Cl, Br, and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX \cdot xA:yLn$, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leqq x \leqq 0.5$ and $0 < y \leqq 0.2$, respectively, as described in Japanese Patent Provisional Publication No. 55(1980)-160078;

$(Ba_{1-x},M^{II}_x)F_2 \cdot aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 10^{-2}$, respectively, as described in Japanese Patent Provisional Publication No. 56(1981)-116777;

$(Ba_{1-x},M^{II}_x)F_2 \cdot aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2 \times 10^{-1}$, and $0 < z \leqq 2 \times 10^{-1}$, respectively, as described in Japanese Patent Provisional Publication No. 57(1982)-23673;

$(Ba_{1-x},M^{II}_x)F_2 \cdot aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively, as described in Japanese Patent Provisional Publication No. 57(1982)-23675;

$M^{III}OX$:xCe, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Provisional Publication No. 58(1983)-69281;

$Ba_{1-x}M_{x/2}L_{x/2}FX$:$yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively, as described in U.S. patent application No. 497,805;

BaFX.xA:$yEu^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.1$ and $0 < y \leq 0.1$, respectively, as described in U.S. patent application No. 520,215;

BaFX·xA:$yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in U.S. patent application No. 502,648;

BaFX·xNaX':$aEu^{2+}$, in which each of X and X' is at least one halogen selected from the group consisting of Cl, Br and I; and x and a are numbers satisfying the conditions of $0 < x \leq 2$ and $0 < a \leq 0.2$, respectively, as described in Japanese Patent Provisional Publication No. 59(1984)-56479;

$M^{II}FX$·xNaX':$yEu^{2+}$:zA, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in U.S. patent application No. 535,928;

$M^{II}FX \cdot aM^{I}X' \cdot bM'^{II}X''_2 \cdot cM^{III}X'''_3 \cdot xA{:}yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively, as described in U.S. patent application No. 543,326;

$M^{II}X_2 \cdot aM^{II}X'_2{:}xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leq a \leq 10.0$ and $0 < x \leq 0.2$, respectively, as described in U.S. patent application No. 660,987;

$M^{II}FX \cdot aM^{I}X'{:}xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leq a \leq 4.0$ and $0 < x \leq 0.2$, respectively, as described in U.S. patent application No. 668,464;

$M^{I}X$:xBi, in which $M^{I}$ is at least one alkali metal selected from the group consisting of Rb and Cs; X is at least one halogen selected from the group consisting of Cl, Br and I; and x is a number satisfying the condition of $0 < x \leq 0.2$, as described in U.S. patent application No. 846,919; and alkali metal halide phosphors as described in Japanese Patent Provisional Publications No. 61(1986)-72087 and No. 61(1986)-72088.

The $M^{II}X_2 \cdot aM^{II}X'_2{:}xEu^{2+}$ phosphor described in the above-mentioned U.S. patent application No. 660,987 may contain the following additives in the following amount per 1 mol of $M^{II}X_2 \cdot aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0 < b \leq 10.0$, as described in U.S. patent application No. 699,325;

$bKX'' \cdot cMgX'''_2 \cdot dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of $0 \leq b \leq 2.0$, $0 \leq c \leq 2.0$, $0 \leq d \leq 2.0$ and $2 \times 10^{-5} \leq b+c+d$, as described in U.S. patent application No. 723,819;

yB, in which y is a number satisfying the condition of $2 \times 10^{-4} \leq y \leq 2 \times 10^{-1}$, as described in U.S. patent application No. 727,974;

bA, in which A is at least one oxide selected from the group consisting of $SiO_2$ and $P_2O_5$; and b is a number satisfying the condition of $10^{-4} \leq b \leq 2 \times 10^{-1}$, as described in U.S. patent application No. 727,972;

bSiO, in which b is a number satisfying the condition of $0 < b \leq 3 \times 10^{-2}$, as described in U.S. patent application No. 797,971;

$bSnX''_2$, in which X'' is at least one halogen selected from the group consisting of F, Cl, Br and I; and b is a number satisfying the condition of $0 < b \leq 10^{-3}$, as described in U.S. patent application No. 797,971;

$bCsX'' \cdot cSnX'''_2$, in which each of X'' and X''' is at least one halogen selected from the group consisting of F, Cl, Br and I; and b and c are numbers satisfying the conditions of $0 < b \leq 10.0$ and $10^{-6} \leq c \leq 2 \times 10^{-2}$, respectively, as described in U.S. patent application No. 850,715; and $bCsX''\cdot yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b\leqq 10.0$ and $10^{-6}\leqq y\leqq 1.8\times 10^{-1}$, respectively, as described in U.S. patent application No. 850,715.

Among these above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the panel of the invention. Any other phosphors can be also employed, provided that the phosphor gives stimulated emission when excited with stimulating rays after exposure to a radiation.

Examples of the binder to be contained in the stimulable phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

The stimulable phosphor layer can be formed on the support, for instance, by the following procedure.

In the first place, the above-described stimulable phosphor and binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethyl ether; and mixtures of the above-mentioned compounds.

The ratio between the binder and the stimulable phosphor in the coating dispersion may be determined according to the characteristics of the aimed radiation image storage panel, the nature of the phosphor employed, etc. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a stimulable phosphor layer. The thickness of the stimulable phosphor layer varies depending upon the characteristics of the aimed radiation image storage panel, the nature of the phosphor, the ratio between the binder and the phosphor, etc. Generally, the thickness of the stimulable phosphor layer is within the range of from 20 $\mu m$ to 1 mm, and preferably from 50 to 500 $\mu m$.

The stimulable phosphor layer can be provided on the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the support by pressing or using an adhesive agent. Otherwise, the stimulable phosphor layer can be formed on the support by molding a powdery stimulable phosphor or a dispersion containing both of stimulable phosphor particles and binder in the form of a sheet, sintering the molded sheet to give a stimulable phosphor layer, and combining the sintered phosphor layer and the support using an adhesive, etc. In this case, the relative density of the phosphor layer can be increased to more than 70%, whereby the quality of an image (e.g., sharpness) provided by the resulting panel can be prominently enhanced. Alternatively, the phosphor layer can be directly formed on the support through a vacuum deposition using the stimulable phosphor.

The stimulable phosphor layer may contain the fibrous conductive material according to the invention. In this case, the fibrous conductive material is added to the solvent together with the stimulable phosphor, and they are mixed to prepare a coating dispersion. Using the obtained coating dispersion, a stimulable phosphor layer is formed on the support in the same manner as described above. The amount of the fibrous conductive material to be contained in the phosphor layer varies depending on the amount of the stimulable phosphor, the thickness of the phosphor layer, etc. Generally, the amount of the fibrous conductive material is in the range of 1 to 50% by weight, preferably 5 to 20% by weight, based on the amount of the stimulable phosphor.

The phosphor layer containing the fibrous conductive material preferably has a surface resistivity of not higher than $10^{12}$ ohm.

On the surface of the stimulable phosphor layer not facing the support, a transparent protective film is provided to protect the phosphor layer from physical and chemical deterioration.

The protective film can be provided on the stimulable phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as poyethylene terephthalate, polyethylene, polyvinylidene chloride or polyamide, followed by placing and fixing it onto the phosphor layer with an appropriate adhesive agent. The thickness of the transparent protective film is preferably in the range of approximately 0.1 to 20 $\mu$m.

The fibrous conductive material, that is a characteristic requisite of the invention, may be contained in a layer of an adhesive for combining the protective film and the stimulable phosphor layer.

The adhesive of the adhesive layer employable in the invention can be selected from various materials conventionally used as an adhesive and the aforementioned binders used in the preparation of a stimulable phosphor layer.

The formation of the adhesive layer containing the fibrous conductive material and the protective film can be conducted by first adding the conductive material to the adhesive solution and well mixing to prepare a coating solution homogeneously containing the conductive material therein, evenly applying the coating solution onto the surface of a transparent thin film (protective film) having been separately prepared, and combining the thin film and the stimulable phosphor layer with the adhesive.

The amount of the fibrous conductive material to be contained in the adhesive layer varies depending on the thickness of the adhesive layer, etc. Generally, the amount thereof is in the range of 1 to 50% by weight, preferably in the range of 5 to 20% by weight, based on the amount of the adhesive. The adhesive layer containing the fibrous conductive material preferably has a surface resistivity of not higher than $10^{12}$ ohm.

The incorporation of the fibrous conductive material is by no means restricted to the above-mentioned cases, and any other cases can be also applied to the invention, provided that the conductive material is contained in at least one portion of the radiation image storage panel, as described before. For example, a layer of the fibrous conductive material (i.e., antistatic layer) may be provided on a surface of the panel (surface of the support, surface of the protective film, etc.) or at any desired portion between the layers constituting the panel. In this case, the layer of the fibrous conductive material can be formed by adding the conductive material and a binder to an appropriate solvent and well mixing to prepare a coating solution homogeneously containing the conductive material in the binder solution, applying the coating solution onto the surface of the support or the surface of the desired layer, and drying the coated layer of the solution.

As the binder employable for the formation of the layer of the fibrous conductive material, there can be mentioned synthetic resins such as polyacrylic resins, polyester resins, polyurethane resins, polyvinyl acetate resins and ethylene/vinyl acetate copolymers. Most preferred are polyester resins and polyacrylic resins. The solvent for the layer of the fibrous conductive material can be selected from the aforementioned solvents used in the preparation of a stimulable phosphor layer.

The amount of the fibrous conductive material to be contained in the layer of the fibrous conductive material is generally in the range of 1 to 50% by weight, preferably 5 to 20% by weight, based on the amount of the binder. The thickness of the layer of the fibrous conductive material is generally in the range of 1 to 50 $\mu$m, and the surface resistivity thereof preferably is not higher than $10^{12}$ ohm.

The radiation image storage panel of the invention may be provided with a covering on the edge portion of at least one side (side surface portion of the panel) to prevent the panel from being damaged, if desired. The covering may contain the fibrous conductive material.

Further, the panel of the invention may be colored with a colorant to enhance the sharpness of the resulting image, as described in U.S. Pat. No. 4,394,581 and U.S. patent application No. 326,642. For the same purpose, the panel of the invention may contain a white powder in the stimulable phosphor layer, as described in U.S. Pat. No. 4,350,893.

The following examples further illustrate the present invention, but these examples are understood to by no means restrict the invention.

EXAMPLE 1

To methyl ethyl ketone-insoluble polyester (Bylon 30P of Toyobo Co., Ltd.) was added a whisker of $K_2O.nTiO_2$ having been subjected to a conducting treatment (conductive whisker, Dentol BK 200 of Ohtsuka Chemical Co., Ltd.), and they were well mixed in a ball mill to prepare a coating solution for an undercoating layer (amount of conductive whisker: 10 wt.% per solid content of polyester).

The coating solution was evenly applied onto a polyethylene terephthalate sheet containing carbon black (support, thickness: 250 $\mu$m) placed horizontally on a glass plate. The application of the coating solution was carried out using a doctor blade. The support having a layer of the coating solution was then dried at a temperature of approx. 100° C. to form an undercoating layer having a thickness of approx. 20 $\mu$m on the support.

Independently, to a mixture of a powdery divalent europium activated barium fluorobromide ($BaFBr:0.001Eu^{2+}$) stimulable phosphor and a linear polyester resin were added successively methyl ethyl ketone and nitrocellulose (nitration degree: 11.5%), to prepare a dispersion containing the phosphor and the binder. Subsequently, tricresyl phosphate, n-butanol and methyl ethyl ketone were added to the dispersion. The mixture was sufficiently stirred by means of a propeller agitator to obtain a homogeneous coating dispersion having a mixing ratio of 1:20 (binder:phosphor, by weight) and a viscosity of 25-30 PS (at 25° C.).

The coating dispersion was evenly applied onto the surface of the undercoating layer provided on the support placed horizontally on a glass plate. The application of the coating dispersion was carried out using a doctor blade. The support having the undercoating layer and a layer of the coating dispersion was then placed in an oven and heated at a temperature gradually rising from 25° to 100° C. to dry the coated layer of the dispersion. Thus, a stimulable phosphor layer having a thickness of 250 $\mu$m was formed on the undercoating layer.

Subseuqently, on the stimulable phosphor layer was placed a transparent polyethylene terephthalate film (thickness: 12 μm; provided with a polyester adhesive on one surface) to combine the transparent film and the phosphor layer with the adhesive.

Thus, a radiation image storage panel consisting essentially of a support, an undercoating layer containing a conductive whisker, a stimulable phosphor layer and a transparent protective film, superposed in order, was prepared (see FIG. 2).

EXAMPLE 2

The procedure of Example 1 was repeated except that a conductive whisker (Dentol WK 200 of Otsuka Chemical Co., Ltd.) was incorporated into the coating dispersion for the formation of a stimulable phosphor layer to prepare a coating dispersion (amount of conductive whisker: 10 wt.% per the stimulable phosphor) and a stimulable phosphor layer was formed on the support using the obtained coating dispersion, instead of providing an undercoating layer, to prepare a radiation image storage panel consisting essentially of a support, a stimulable phosphor layer containing a conductive whisker and a transparent protective film, superposed in order (see FIG. 1).

EXAMPLE 3

To a dioxane solution of polyester (Bylon 30P of Toyobo Co., Ltd.) were added zirconium oxide ($ZrO_2$, average particle diameter: 2 μm) and a conductive whisker (Dentol WK 200 of Otsuka Chemical Co., Ltd.), and the mixture was stirred by means of a propeller agitator to prepare a coating solution for a light-reflecting layer (solid content of binder: 20 wt.% per $ZrO_2$, amount of conductive whisker: 10 wt.% per $ZrO_2$).

The procedure of Example 1 was repeated except for providing a light-reflecting layer having a thickness of 40 μm on the support using the obtained coating solution, instead of providing an undercoating layer, to prepare a radiation image storage panel consisting essentially of a support, a light-reflecting layer containing a conductive whisker, a stimulable phosphor layer and a transparent protective film, superposed in order (see FIG. 3).

EXAMPLE 4

The procedure of Example 1 was repeated except that a conductive whisker (Dentol WK 200 of Otsuka Chemical Co., Ltd.) was incorporated into an adhesive (amount of conductive whisker: 10 wt.% per the adhesive) and the stimulable phosphor layer was combined with the transparent film using the adhesive, instead of providing an undercoating layer, to prepare a radiation image storage panel consisting essentially of a support, a stimulable phosphor layer, an adhesive layer containing a conductive whisker and a transparent protective film, superposed in order (see FIG. 4).

EXAMPLE 5

To a polyester binder solution was added a conductive whisker (Dentol BK 200 of Otsuka Chemical Co., Ltd.), and the mixture was stirred by means of a propeller agitator to prepare a coating solution for a layer of conductive whisker (amount of conductive whisker: 10 wt.% per the binder).

The procedure of Example 1 was repeated except for providing a layer of conductive whisker having a thickness of 10 μm on the back surface of the support using the obtained coating solution, instead of providing an undercoating layer, to prepare a radiation image storage panel consisting essentially of a layer of conductive whisker, a support, a stimulable phosphor layer and a transparent protective film, superposed in order (see FIG. 5).

COMPARISON EXAMPLE 1

The procedure of Example 1 was repeated except for not providing an undercoating layer on the support, to prepare a radiation image storage panel consisting essentially of a support, a stimulable phosphor layer and a transparent protective film, superposed in order.

COMPARISON EXAMPLE 2

The procedure of Example 1 was repeated except for using conductive carbon black (amount of carbon black: 5 wt.% per solid content of polyester) instead of the conductive whisker, to prepare a radiation image storage panel consisting essentially of a support, an undercoating layer containing carbon black, a stimulable phosphor layer and a transparent protective film, superposed in order.

COMPARISON EXAMPLE 3

The procedure of Example 1 was repeated except for using conductive carbon black (amount of carbon black: 50 wt.% per solid content of polyester) instead of the conductive whisker, to prepare a radiation image storage panel consisting essentially of a support, an undercoating layer containing carbon black, a stimulable phosphor layer and a transparent protective film, superposed in order.

The radiation image storage panels obtained in Examples 1 to 5 and Comparison Examples 1 to 3 were evaluated on the surface resistance, the transfer property and the occurrence of unevenness of images provided by the panels according to the following tests.

Surface resistance

Each of the supports provided with a layer containing the conductive material (Examples 1 to 5 and Comparison Examples 2 and 3) and the support of Comparison Example 1 were respectively cut to give a test strip (110 mm×110 mm). The test strip was placed on a circle electrode (P-601 type, produced by Kawaguchi Electric Co., Ltd.) which was combined with an insulation measuring device (EV-40 type ultra insulation measuring device, produced by Kawaguchi Electric Co., Ltd.), and applied a voltage to measure the surface resistivity (SR) of the test strip. The measurement of the surface resistivity was done under the conditions of a temperature of 23° C. and a humidity of 53 %RH.

The results are set forth in Table 1.

TABLE 1

| | Layer | Surface Resistivity (ohm) |
|---|---|---|
| Example 1 | undercoating layer containing conductive whisker | $10^8$ |
| Example 2 | stimulable phosphor layer containing conductive whisker | $10^{10}$ |
| Example 3 | light-reflecting layer containing conductive whisker | $10^{12}$ |
| Example 4 | adhesive layer containing conductive whisker | $10^{11}$ |
| Example 5 | layer of conductive whisker | $10^9$ |
| Com. Ex. 1 | none | $10^{16}$ |
| Com. Ex. 2 | undercoating layer containing carbon black (5 wt. %) | $10^{14}$ |
| Com. Ex. 3 | undercoating layer containing | $10^7$ |

TABLE 1-continued

| Layer | Surface Resistivity (ohm) |
|---|---|
| carbon black (50 wt. %) | |

As is evident from the results set forth in Table 1, each of the layers containing a conductive whisker in the radiation image storage panels according to the present invention (Examples 1 to 5) had a surface resistivity of not higher than $10^{12}$ ohm.

The radiation image storage panel having an undercoating layer containing carbon black in a large amount, namely 50 wt.%, (Comparison Example 3) had a surface resistivity of the undercoating layer of not higher than $10^{12}$ ohm, but the radiation image storage panel having an undercoating layer containing carbon black in a small amount, namely 5 wt.%, (Comparison Example 2) had a surface resistivity of the undercoating layer of not lower than $10^{12}$ ohm. In the conventional panel (Comparison Example 1), the support containing carbon black showed an extremely high surface resistivity.

Transfer property

Figure 6:
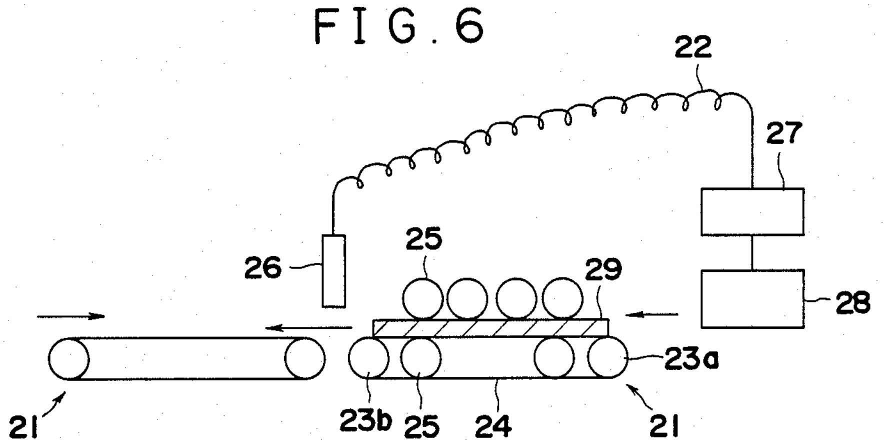
FIG. 6 schematically illustrates a static electricity testing device for evaluating the transfer property of a radiation image storge panel.

The evaluation on the transfer property of the radiation image storage panel was done by using a static electricity testing device shown in FIG. 6.

FIG. 6 is schematically illustrates a static electricity testing device. The device comprises transferring means 21, 21' and an electric potential measuring means (static charge gauge) 22. Each of the transferring means 21, 21' comprises rolls 23a, 23b made of urethane rubber, an endless belt 24 supported by the rolls and an assisting roll 25 made of phenol resin. The electric potential measuring means 22 comprises a detector 26, a voltage indicator 27 connected to the detector and a recorder 28.

The evaluation was carried out by introducing the radiation image storage panel into the transferring means 21, 21', subjecting the panel to the repeated transferring procedures of 100 times in the right and left directions (directions indicated by arrows in FIG. 6), then bringing the surface of the panel (protective film-side surface) into contact with the detector 26 to measure the electric potential (KV) on the surface of the panel.

The results are set forth in Table 2.

Occurrence of unevenness of image

The radiation image storage panel which had been exposed to X-rays was introduced into the above-mentioned static electricity testing device (installed in a dark room), and the panel was subjected to the repeated transferring procedures of 10 times in the same manner as described above. Then, the panel was subjected to a read-out procedure (reproduction procedure) by the use of a radiation image reading apparatus (FCR101, produced by Fuji Photo Film Co., Ltd.), and the reproduced image was visualized on a radiographic film. The evaluation on the occurrence of unevenness of the resulting image was done by observing occurrence of a noise (i.e., static mark caused by static discharge) on the radiographic film through visual judgment. This test was conducted under the conditions of a temperature of 10° C. and a humidity of 20 %RH.

The results are also set forth in Table 2.

TABLE 2

| | Surface Potential (KV) | Occurrence of Noise |
|---|---|---|
| Example 1 | −0.6 | not observed |
| Example 2 | −0.4 | not observed |
| Example 3 | −0.6 | not observed |
| Example 4 | −0.4 | not observed |
| Example 5 | −1.1 | not observed |
| Com. Example 1 | −7.0 | observed (many noises) |
| Com. Example 2 | −5.0 | observed (many noises) |
| Com. Example 3 | −0.5 | not observed |

As is evident from the results set forth in Table 2, each of the radiation image storage panels containing a conductive whisker according to the invention (Examples 1 to 5) hardly varied on the surface potential even after the transferring procedure and showed high antistatic properties. Particularly, the panel containing the conductive material in the undercoating layer, light-reflecting layer, phosphor layer or the adhesive layer (Examples 1 to 4) showed prominently improved antistatic properties. Further, any noise caused by static discharge was not observed on the radiographic film with respect to the panels of the invention, and accordingly an image of high quality was provided by each of the panels of the invention.

On the other hand, the conventional panel containing no fibrous conductive material (Comparison Example 1) and the panel containing a small amount of carbon black (Comparison Example 2) both had a large potential difference on the surface after the transferring procedure, and a great number of noises caused by static discharge were observed on the radiographic film with respect to those panels for comparison.

The radiation image storage panel containing a large amount of carbon black (Comparison Example 3) hardly varied on the surface potential even after the transferring procedure, and any noise caused by static discharge was not observed on the radiographic film. However, the adhesion strength of the undercoating layer containing carbon black was not enough, so that the undercoating layer easily separated from the adjacent layer. Accordingly, the panel was unsatisfactory in practical use.

It was confirmed from the above-mentioned results that the antistatic properties of a radiation image storage panel largely depends on the surface resistivity of a layer containing a conductive material, and satisfactory antistatic properties can be given to the panel in the case that the surface resistivity of the layer containing the conductive material is not higher than $10^{12}$ ohm.

We claim:

1. A radiation image storage panel comprising a support made of a plastic film or a paper material and a stimulable phosphor layer provided on the support, wherein a fibrous conductive material is contained in at least a portion of said radiation image storage panel, and wherein said fibrous conductive material is in the form of a whisker of $K_2O \cdot nTiO_2$ or $Na_2O \cdot nTiO_2$, where n is an integer from 1-8, which is treated with a material selected from the group consisting of C, Zn, O, $SnO_2$, $InO_2$ and a mixed crystal of $SnO_2$ and $InO_2$, said whisker having an average diameter of 0.1 to 1.0 μm and an average length of 5-50 μm.

2. The radiation image storage panel as claimed in claim 1, wherein said fibrous conductive material has a ratio of an average diameter to an average length of not less than 1/5.

3. The radiation image storage panel as claimed in claim 1, wherein said fibrous conductive material has a ratio of an average diameter to an average length in the range of 1/10 to 1/200.

4. The radiation image storage panel as claimed in claim 1, wherein said fibrous conductive material is contained in the stimulable phosphor layer and the stimulable phosphor layer has a surface resistivity of not higher than $10^{12}$ ohm.

5. The radiation image storage panel as claimed in claim 1, wherein said panel comprises a support, an undercoating layer and a stimulable phosphor layer, superposed in order, said undercoating layer containing the fibrous conductive material, and surface resistivity of the undercoating layer is not higher than $10^{12}$ ohm.

6. The radiation image storage panel as claimed in claim 1, wherein said panel comprises a support, a light-reflecting layer and a stimulable phosphor layer, superposed in order, said light-reflecting layer containing the fibrous conductive material, and surface resistivity of the light-reflecting layer is not higher than $10^{12}$ ohm.

7. The radiation image storage panel as claimed in claim 1, wherein said panel comprises a support, a stimulable phosphor layer, an adhesive layer and a protective film, superposed in order, said adhesive layer containing the fibrous conductive material, and surface resistivity of the adhesive layer is not higher than $10^{12}$ ohm.

8. The radiation image storage panel as claimed in claim 1, wherein a layer made of the fibrous conductive material is provided on the surface of the support not facing the stimulable phosphor layer and the surface resistivity of said fibrous conductive layer is not higher than $10^{12}$ ohm.

* * * * *